UNITED STATES PATENT OFFICE.

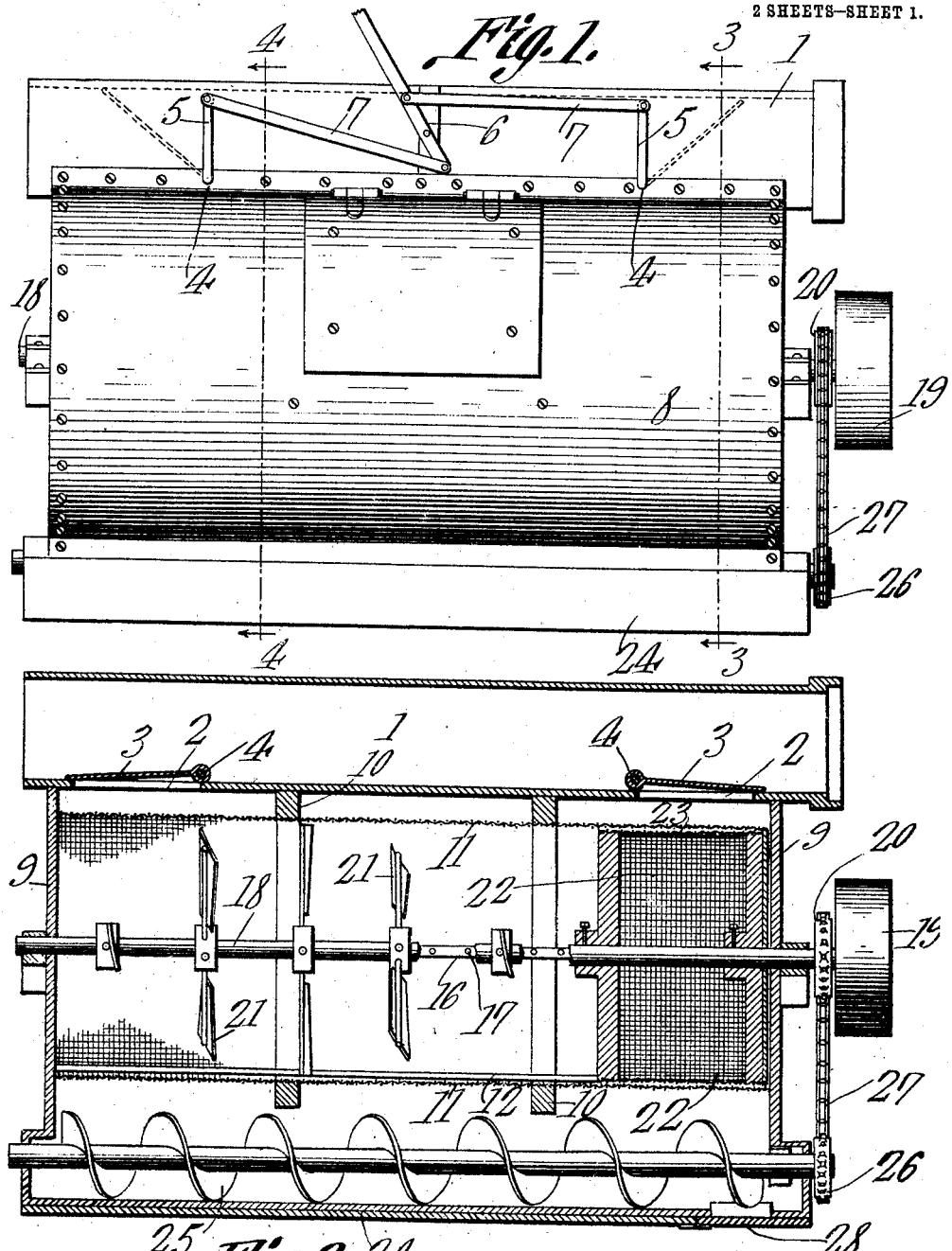

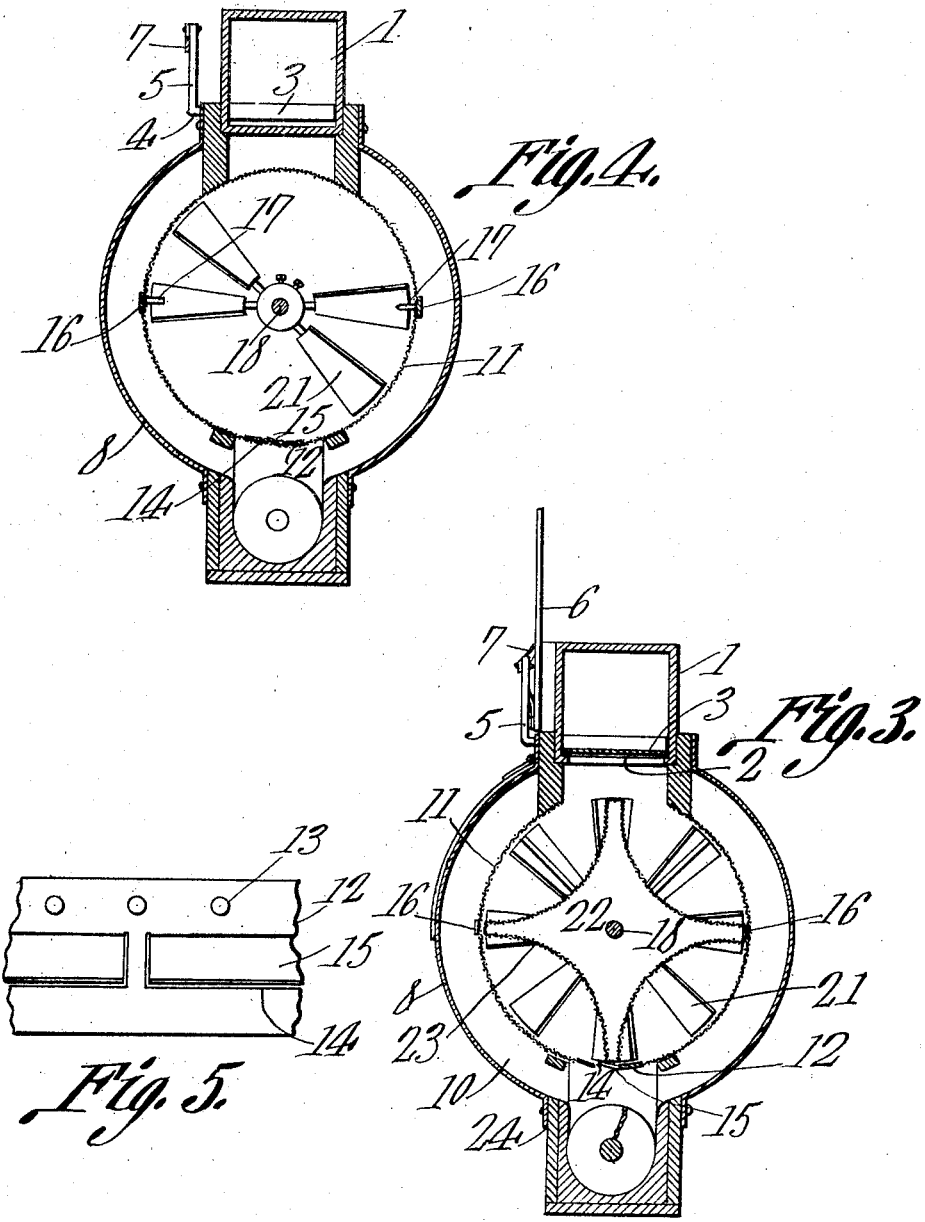

MALON I. FLOWERS, OF WAELDER, TEXAS.

SEED-COTTON CLEANER.

1,006,542.  Specification of Letters Patent.  Patented Oct. 24, 1911.

Application filed January 4, 1911. Serial No. 600,730.

*To all whom it may concern:*

Be it known that I, MALON I. FLOWERS, a citizen of the United States, residing at Waelder, in the county of Gonzales and State of Texas, have invented a new and useful Seed-Cotton Cleaner, of which the following is a specification.

This invention has relation to seed cotton cleaners and consists in the novel construction and arrangement of its parts as hereinafter shown and described.

The object of the invention is to provide a cleaner adapted to be attached to the suction pipe in a gin house which is adapted to convey the seed cotton from a wagon or other receptacle to the gin in such manner that an operator may cause the seed cotton to pass directly through the pipe without passing through the cleaner or may cause the said cotton to pass from the pipe through the cleaner then back to the pipe again to the gin.

With this object in view the cleaner comprises a cylindrical casing approximately horizontally disposed and connecting at its upper side and in the vicinity of its opposite ends with the lower side of the suction pipe. Valves are mounted in the suction pipe and are operatively connected together whereby they may simultaneously move away from or close the said openings. A screen is supported within the cylindrical casing and is spaced from the same. A gutter is attached to the lower side of the cylindrical casing and an auger conveyer is arranged to operate in the said gutter. The gutter is provided at one end with a valved outlet. A shaft is journaled in the ends of the cylindrical casing and extends longitudinally thereof within the said screen and is provided at intervals with blades. The said shaft is also provided at one end portion with a cage which is located under the outlet opening into the said casing. Bars extend longitudinally of the screen within the casing and are provided at intervals with breaking pins, and plates having openings are located in the lower portion of the screen and have their portions about the said openings so disposed that the locks of cotton will pass over the openings while foreign substances as for instance sand, gravel, etc., may gravitate through the said openings into the gutter below.

In the accompanying drawings—Figure 1 is a side elevation of the seed cotton cleaner. Fig. 2 is a longitudinal sectional view of the same. Fig. 3 is a transverse sectional view of the same cut on the line 3—3 of Fig. 1. Fig. 4 is a transverse sectional view of the same cut on the line 4—4 of Fig. 1. Fig. 5 is a plan view of a portion of the plate provided at the lower side of the screen.

As illustrated in the accompanying drawings, the numeral 1 indicates a section of the suction pipe which is usually found in a gin house and which is designed to convey the seed cotton from a wagon or other source of supply to the gins. In the present instance the pipe 1 is provided in its lower side with openings 2 over which hinged valves 3 are located. The free ends of the valves 3 are oppositely disposed within the pipe 1 and each valve is mounted upon a shaft 4. The shafts 4 project through the side of the pipe 1 and are provided with crank arms 5. A lever 6 is fulcrumed upon the side of the pipe 1 and the outer ends of links 7 are pivotally connected with the upper ends of the crank arms 5 while the inner ends of the said links 7 are pivotally connected with the lever 6 at the opposite sides of the fulcrum point thereof. By this arrangement it will be seen that when the lever 6 is swung in one direction the valves 3 will be simultaneously closed down over the openings 2 in the lower side of the pipe 1 and when the said lever 6 is swung in an opposite direction the said valves 3 are simultaneously swung away from the openings 2 in the lower side of the pipe 1 and are disposed in inclined positions within the said pipe 1 whereby they interrupt the passage way through the said pipe.

The cleaner proper includes a cylindrical casing 8 which is attached at its upper side to the lower side of the pipe 1 and which receives between its heads the openings 2 in the said pipe. The side of the casing 8 is made from sheet metal and is held in its cylindrical shape by means of circular ribs 10 applied to the inner surface of the said side. Semi-cylindrical screens 11 are secured to the inner edges of the ribs 10 and at their ends to the heads 9 and the said screen sections traverse the length of the casing 8. The screen sections 11 are spaced from each other at their upper and lower edges and a plate 12 is located between the lower edges of the screen sections 11 and is provided at intervals along its length and in the vicinity of one of its edges with a series of circular openings 13. The said plate is also provided with openings 14 made by cutting incisions in the said plate and bending the material encompassed within the incisions in an upward direction forming hoods 15 which are disposed at their free end portions above the said openings 14. The space between the upper edges of the screen sections 11 is located vertically below the openings 2 provided in the lower side of the pipe 1. Side bars 16 traverse the length of the casing 8 and are located at the sides of the screen sections 11. The said bars 16 are provided upon their inner sides with breaking pins 17 which project inwardly from the inner sides of the screen sections 11. A shaft 18 is journaled in the heads 9 of the casing 8 and traverses the length of the said casing and one end projects to a considerable extent beyond one of the heads 9. A belt pulley 19 is fixed to the projecting end portion of the shaft 18 as is also a sprocket wheel 20. Blades 21 are fixed to the intermediate portion of the shaft 18 at intervals along the length of the said shaft and are located within the screen sections 11. An elevating cage 22 made of screen material is also fixed to the shaft 18 at the outlet end portion of the casing 8 and the said cage is provided with a series of concaved sides 23 which at their corner portions are in close proximity to the inner surfaces of the screen sections 11 but at their intermediate portions are bowed away from the said screen sections 11 to considerable extent as illustrated in Fig. 3 of the drawing. The cage 22 is located vertically below the outlet opening 2 of the pipe 1. The casing 8 opens at its lower side into a trough 24 which is attached to the said casing and in which is journaled a screw conveyer 25. The end of the shaft of the conveyer 25 projects beyond one of the heads 9 of the casing 8 and is provided with a sprocket wheel 26. A sprocket chain 27 is trained around the sprocket wheels 20 and 26 and is adapted to transmit rotary movement from the shaft 18 to the conveyer 25. The trough 24 is provided in its bottom in the vicinity of its end with a valved outlet 28.

In operation, when it is desired to pass the seed cotton from the pipe section 1 through the casing 8 the lever 6 is swung so that the valves 3 are inclined within the section 1 and obstruct the passageway therethrough. Therefore as one end of the pipe 1 is subjected to suction the suction draft will enter the other end of the said pipe 1 carrying with it the seed cotton. At the same time the shaft 18 is rotated and through the sprocket chain 27 the conveyer 25 is operated in the trough 24. As the draft carrying the cotton enters the receiving end of the casing 8 the cotton falls upon the blades and is carried around against the inner surfaces of the screen sections 11 by the said blades. Air will pass between the blades carrying with it dust and fine particles and as the portion of the draft traverses the length of the casing the said dust may settle and pass down through the openings in the plate 12 and through the meshes of the screen sections 11 into the trough 24. As the cotton is drawn along the screen sections 11 it will be engaged by the blades 21 and carried around the inner surfaces of the said sections. As the cotton encounters the breaking pins 17 it is broken up and separated into locks which are carried around the said screen sections and inasmuch as the sections 11 are spaced from the inner surface of the casing 8 the air will pass between the screen sections and the casing carrying the fine particles of dust and other foreign material with it while the cotton is carried along within the screen sections until it arrives in the concavities formed by the outer face of the cage 22 and which are located under the opening 2 at the exit end of the casing 8. It is then carried up by the cage 22 then by draft into the pipe 1 and along the same to the gins. The particles of dust and other foreign material that are carried through the meshes of the screen sections 11 will gravitate down along the inner surfaces of the sides of the casing 8 and eventually enter the trough 24. The larger heavy bodies as for instance gravel or sand which may be carried by the fiber of the cotton will shake from the cotton and pass down upon the upper surface of the plate 12. In view of the fact that the openings 14 in the said plate are hooded by the portions 15 of the said plate the cotton locks cannot pass down through the openings 14 but will be carried over the said openings by the blades 21 but the heavy foreign bodies as for instance gravel and sand will gravitate down through the openings 14 and also through the openings 13 in the plate 12 and will fall into the trough 24. Inasmuch as the conveyer 25 is operating in the trough 24 the said material collected in the trough is carried along toward the valved outlet 28 through which it makes its exit out of the cleaner.

Having described the invention, what I claim as new and desire to secure by Letters Patent is:

1. A cotton cleaning apparatus including a suction draft pipe having valved openings, a cylindrical screen having an inlet and an outlet communicating with the respective openings, means for shifting the valves for directing an air current through the openings and longitudinally within the screen and thence back to the pipe, and an elevating cage mounted for rotation within the screen and adjacent the outlet opening thereof, said cage having a peripheral screen portion formed with a plurality of concavities constituting pockets.

2. A cotton cleaning apparatus including a suction draft pipe having valved openings, a cylindrical screen having an inlet and an outlet communicating with the respective openings, means for shifting the valves for directing an air current through the openings and longitudinally within the screen and thence back to the pipe, an elevating cage mounted for rotation within the screen and adjacent the outlet opening thereof, said cage having a peripheral screen portion formed with a plurality of concavities constituting pockets, and a series of blades revoluble with the cage and within the cylindrical screen, breaking pins within the said screen and coöperating with the blades, a gutter for receiving screenings from the cylindrical screen and from the cage, and a conveyer mounted for rotation within the gutter.

In testimony that I claim the foregoing as my own, I have hereto affixed my signature in the presence of two witnesses.

MALON I. FLOWERS.

Witnesses:
S. H. VAUGHAN,
G. G. VAUGHAN.